(12) United States Patent
Imanishi

(10) Patent No.: US 6,902,510 B2
(45) Date of Patent: Jun. 7, 2005

(54) TOROIDAL-TYPE CONTINUOUSLY VARIABLE TRANSMISSION

(75) Inventor: Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 41 days.

(21) Appl. No.: 10/339,342

(22) Filed: Jan. 10, 2003

(65) Prior Publication Data

US 2003/0130087 A1 Jul. 10, 2003

(30) Foreign Application Priority Data

Jan. 10, 2002 (JP) ..................................... P. 2002-003672

(51) Int. Cl.$^7$ ............................................. F16H 15/38
(52) U.S. Cl. ......................................... 476/42; 476/40
(58) Field of Search ............................... 476/40, 42, 46

(56) References Cited

U.S. PATENT DOCUMENTS

| | | | |
|---|---|---|---|
| 5,033,322 A | | 7/1991 | Nakano |
| 5,368,529 A | | 11/1994 | Machida |
| 5,569,112 A | | 10/1996 | Fukushima |
| 5,651,750 A | | 7/1997 | Imanishi et al. |
| 6,659,907 B2 | * | 12/2003 | Hirano et al. .................. 476/42 |

FOREIGN PATENT DOCUMENTS

| | | | |
|---|---|---|---|
| JP | A 2-283949 | | 11/1990 |
| JP | UM 6-6788 | | 1/1994 |
| JP | A 8-4869 | | 1/1996 |
| JP | A 8-61453 | | 3/1996 |
| JP | A 10-339361 | | 12/1998 |
| JP | 11-51136 | * | 2/1999 |

* cited by examiner

Primary Examiner—William C. Joyce
(74) Attorney, Agent, or Firm—Sughrue Mion, PLLC

(57) ABSTRACT

A toroidal-type continuously variable transmission, has: a casing; an input rotary shaft; a pair of input side disks each including an input side inner surface and respectively supported on the input rotary shaft; an output cylinder supported on the input rotary shaft; a pair of output side disks each including an output side inner respectively supported on the periphery of the output cylinder; an output rotation transmission member fixed to the outer peripheral surface of the middle portion of the output cylinder; support members interposed respectively between the input side inner surfaces and the output side inner surfaces; power rollers being contacted with the input side inner surfaces and the output side inner surfaces; and, a rolling bearing disposed between the input side inner surface and the output side inner surfaces and rotatably supporting the output cylinder.

6 Claims, 3 Drawing Sheets

TOROIDAL-TYPE CONTINUOUSLY VARIABLE TRANSMISSION

BACKGROUND OF THE INVENTION

1. Field of the Invention

A toroidal-type continuously variable transmission according to the present invention is used as a transmission unit constituting an automatic transmission apparatus for a vehicle or as a transmission for adjusting the operating speeds of various kinds of industrial machines such as a pump.

2. Description of the Related Art

As an example of a transmission unit which constitutes a transmission for a vehicle, there is known a toroidal-type continuously variable transmission and the toroidal-type continuously variable transmission is conventionally enforced in part of the vehicle industry. The toroidal-type continuously variable transmission, which has been conventionally enforced in part of the vehicle industry, is a toroidal-type continuously variable transmission of a so called double cavity type which transmits power from an input part thereof to an output part thereof by using two systems arranged in parallel to each other. This type of toroidal-type continuously variable transmission is disclosed in many publications such as the U.S. Pat. No. 5,033,322 publication, U.S. Pat. No. 5,569,112 publication, and U.S. Pat. No. 5,651,750 and is thus conventionally known, while the basic structure of this toroidal-type continuously variable transmission will be described below with reference to FIG. 3.

According to the toroidal-type continuously variable transmission shown in FIG. 3, an input side disk 2a is supported on the periphery of the near-to-base-end portion of the middle portion of an input rotary shaft 1 (in FIG. 3, the left-shifted portion) and a second input side disk 2b is supported on the periphery of the near-to-front-end portion of the middle portion of the input rotary shaft 1 (in FIG. 3, the right-shifted portion). The input side disk 2a and the second input side disk 2b are respectively supported through their associated ball splines 4, 4 and in such a manner that their respective input side inner surfaces 3, 3 respectively formed as toroidal curved surfaces are opposed to each other. Therefore, the two input side disks 2a, 2b are respectively supported on the periphery of the input rotary shaft 1 in such a manner that they can be shifted in the axial direction of the input rotary shaft 1 and can be rotated synchronously with the input rotary shaft 1.

Also, between the base end portion of the input rotary shaft 1 and the outer surface of the input side disk 2a, there are interposed a rolling bearing 5 and a pressing device 6 of a loading cam type. And, a cam plate 7 constituting the pressing device 6 is disposed so as to be driven or rotated by a drive shaft 8. On the other hand, between the front end portion of the input rotary shaft 1 and the outer surface of the second input side disk 2b, there are interposed a loading nut 9 and a countersunk plate spring 10 having a large elastic force.

The middle portion of the input rotary shaft 1 penetrates through a through hole 13 opened up in a partition wall portion 12 formed in the interior of a casing 11 (see FIGS. 1 and 2 which show an embodiment of the present invention) in which a toroidal-type continuously variable transmission is stored. On the inside diameter side of the through hole 13, there is rotatably supported a cylindrical-shaped output cylinder 28 by a pair of rolling bearings 14, 14, while an output gear 15 is fixedly secured to the outer peripheral surface of the middle portion of the output cylinder 28. Also, two output side disks 16a, 16b are respectively supported by spline engagement on such portions of the two end portions of the output cylinder 28 that are projected from the two outer surfaces of the partition wall portion 12 in such a manner that they can be rotated synchronously with the output cylinder 28. In this state, the output side inner surfaces 17, 17 of the respective output side disks 16a, 16b respectively formed as toroidal curved surfaces are respectively opposed to the input side inner surfaces 3, 3. Also, between the outer peripheral surface of the middle portion of the input rotary shaft 1 and such portions of the respective inner surfaces of the two output side disks 16a, 16b that are projected from the end edges of the output cylinder 28, there are respectively interposed needle roller bearings 18, 18; and thus, while supporting loads to be applied to the respective output side disks 16a, 16b, the needle roller bearings 18, 18 allow the output side disks 16a, 16b not only to rotate with respect to the input rotary shaft 1 but also to shift in the axial direction of the input rotary shaft 1 with respect to the input rotary shaft 1.

Also, in each of such intermediate portions (cavities) between the input side and output side inner surfaces 3, 17 that are situated in the periphery of the input rotary shaft 1, there are interposed a plurality of (generally, two or three) power rollers 19, 19. The power rollers 19, 19 are respectively structured such that the peripheral surfaces 29, 29 thereof to be contacted with the input side and output side inner surfaces 3, 17 are formed as spherically-shaped convex surfaces. The power rollers 19, 19 are respectively supported on the inner surface portions of their associated trunnions 20, 20 corresponding to support members as set forth in the appended claims of the present specification in such a manner that they can be rotated and can be swung and shifted slightly by displacement shafts 21, 21, radial needle roller bearings 22, 22, thrust ball bearings 23, 23, and thrust needle roller bearings 24, 24. That is, each of the displacement shafts 21, 21 is an eccentric shaft in which its base half section and its front half section are set eccentric to each other; and, the base half sections of the displacement shafts 21 are respectively supported on the middle portions of their associated trunnions 20, 20 by another radial needle roller bearings (which are not shown) in such a manner that they can be swung and shifted.

The power rollers 19, 19 are respectively rotatably supported on the front half sections of the thus-structured displacement shafts 21, 21 by the radial needle roller bearings 22, 22 and thrust ball bearings 23, 23. Also, the above radial needle roller bearings (not shown) and thrust needle roller bearings 24, 24 permit the shifting movements of the respective power rollers 19, 19 with respect to the axial direction of the input rotary shaft 1 that could be caused by the elastic deformation of the respective composing members.

Further, the trunnions 20, 20 respectively support their associated pivot shafts, which are disposed on the two end portions (in FIG. 3, the end portions situated in the front and back direction) of the trunnions 20, on support plates 25a, 25b (see FIGS. 1 and 2 which show first and second embodiments of the present invention) installed on the interior of the casing 11 in such a manner that the pivot shafts can be swung as well as can be shifted in the axial directions thereof. That is, the trunnions 20, 20 are supported in such a manner that not only they can be shifted clockwise and counterclockwise in FIG. 3 but also they can be shifted in the axial directions of the pivot shafts (in FIG. 3, in the front and back direction; and, in FIGS. 1 and 2, in the vertical direction) by actuators (not shown).

To operate the above-structured toroidal-type continuously variable transmission, the input side disk 2a may be driven or rotated by the drive shaft 8 through the pressing device 6. This pressing device 6 drives or rotates the input side disk 2a while generating propulsive power going in the axial direction of the input rotary shaft 1; and thus, the pair of input side disks 2a, 2b including the above input side disk 2a are rotated synchronously with each other while they are being pressed toward their respective output side disks 16a, 16b. As a result of this, the rotational movements of the input side disks 2a, 2b are transmitted through the power rollers 19, 19 to the output side disks 16a, 16b respectively, thereby rotating the output gear 15 which is coupled to the output side disks 16a, 16b through the output cylinder 28.

When the toroidal-type continuously variable transmission is in operation, the propulsive power generated by the pressing device 6 secures surface pressures between the respective contact portions between the peripheral surfaces 29, 29 of the power rollers 19, 19 and the input side and output side inner surfaces 3, 17. Also, the surface pressures increase as the power (torque) to be transmitted from the drive shaft 8 to the output gear 15 increases. Therefore, there can be obtained a good transmission efficiency regardless of variations in the torque. Also, even in case where the torque to be transmitted is 0 or very small, a preload spring 26 disposed on the inside diameter side of the pressing device 6 can secure the surface pressures in the respective contact portions to a certain degree. Due to this, the torque transmission in the respective contact portions can be executed smoothly without causing excessive slippage just after the toroidal-type continuously variable transmission is put into operation.

To change a transmission ratio between the drive shaft 8 and output gear 15, the trunnions 20, 20 may be shifted in the front and back direction in FIG. 3 by the irrespective actuators (not shown). In this case, the trunnions 20, 20 disposed in the upper half section of FIG. 3 and trunnions 20, 20 in the lower half section thereof are shifted by the same quantities in the mutually opposite directions. The shifting movements of the trunnions 20, 20 change the directions of the forces that are applied to the tangential directions of the contact portions between the peripheral surfaces 29, 29 of the power rollers 19, 19 and the input side and output side inner surfaces 3, 17. And, due to such change in these tangential-direction forces, the trunnions 20, 20 are respectively swung about their associated pivot shafts disposed on the two end portions thereof. These swinging movements of the trunnions 20, 20 change the positions of the contact portions between the peripheral surfaces 29, 29 of the power rollers 19, 19 and the input side and output side inner surfaces 3, 17 with respect to the diameter directions of the two inner surfaces 3, 17. The more these contact portions change outwardly in the diameter direction of the input side inner surface 3 and inwardly in the diameter direction of the output side inner surface 17, the more the transmission ratio changes to the speed increasing side. On the other hand, the more these contact portions change inwardly in the diameter direction of the input side inner surface 3 and outwardly in the diameter direction of the output side inner surface 17, the more the transmission ratio changes to the speed reducing side.

In the case of the conventional structure shown in FIG. 3, since not only the output gear 15 but also the pair of rolling bearings 14, 14 are interposed between the respective outer surfaces 27, 27 of the pair of output side disks 16a, 16b, the distance $D_{27}$ between the two outer surfaces 27, 27 is large. This increases the axial-direction dimension of the toroidal-type continuously variable transmission, which increases the size and weight of the toroidal-type continuously variable transmission. Such increased size and weight is caused not only by the increase in the distance $D_{27}$ but also by an increase in the axial-direction thickness of the output side disks 16a, 16b. The reason for this is as follows.

In the speed reducing state of the toroidal-type continuously variable transmission shown in FIG. 3, the peripheral surfaces 29, 29 of the power rollers 19, 19 press against the output side inner surfaces 17, 17 of the output side disks 16a, 16b while they are contacted with the near-to-outside-diameter portions of the output side inner surfaces 17, 17. Due to this, a large moment about the spline engaged portion of the output cylinder 28 is applied to the output side disks 16a, 16b. In order not only to restrict variations in the transmission ratio but also to secure the durability of the output side disks 16a, 16b, it is necessary to restrict the elastic deformation of the output side disks 16a, 16b. And, in order to restrict such elastic deformation, it is necessary to increase the axial-direction thickness dimensions of the output side disks 16a, 16b to thereby enhance the rigidity of the output side disks 16a, 16b. Thus, in case where the axial-direction thickness dimensions of the output side disks 16a, 16b are increased for these reasons, the size of the toroidal-type continuously variable transmission is increased in the above-mentioned manner.

SUMMARY OF THE INVENTION

The toroidal-type continuously variable transmission of the present invention is invented in order to solve the above problems found in the conventional toroidal-type continuously variable transmission.

As means for solving the problems found in the conventional toroidal-type continuously variable transmission, according to the present invention, there is provided a toroidal-type continuously variable transmission, having: a casing; an input rotary shaft rotatably supported in the interior of the casing; a pair of input side disks each including an input side inner surface having an arc-shaped section and respectively supported on the two portions of the input rotary shaft in such a manner that the respective input side inner surfaces are opposed to each other, the pair of input side disks being rotatable synchronously with the input rotary shaft; an output cylinder supported on the periphery of the middle portion of the input rotary shaft so as to be rotated relatively with respect to the input rotary shaft; a pair of output side disks each including an output side inner surface having an arc-shaped section and respectively supported on the periphery of the output cylinder so as to be rotated synchronously with the output cylinder, the output side inner surfaces of the output side disks being respectively opposed to the input side inner surfaces of the input side disks; an output rotation transmission member fixed to the outer peripheral surface of the middle portion of the output cylinder between the two output side disks so as to be concentric with the two output side disks; support members interposed respectively between the input side inner surfaces of the input side disks and the output side inner surfaces of the output side disks by plural number so as to be swung about respective pivot shafts thereof disposed at twisted positions with respect to the input rotary shaft; power rollers each including a peripheral surface formed as a spherically-shaped convex surface and respectively rotatably supported on associated ones of the support members, the peripheral surfaces of the power rollers being contacted with the input side inner surfaces of the input side disks and the output side inner surfaces of the output side disks; and, a rolling bearing disposed between the input side inner surface of at least one of the input side disks and the output side inner surfaces opposed to the input side inner surface so as to be supported in the casing, and rotatably supporting the output cylinder.

And, according to the present invention, a pair of rolling bearings respectively disposed between the respective input side inner surfaces of the input side disks and the respective output side inner surfaces of the output side disks may rotatably support the two end portions of the output cylinder, and the two rolling bearings may be ball bearings of an angular contact type with the directions of respective contact angles thereof differing from each other or a deep groove type.

Also, according to the present invention, a rolling bearing disposed between one of the input side inner surfaces of the input side disks and the output side inner surfaces of the output side disks opposed to the input side inner surface rotatably may support one end portion of the output cylinder, and the rolling bearing may be a ball bearing of a four-point contact type which includes an outer ring having an outer raceway formed in an inner surface thereof, an inner ring having an inner raceway formed in an outer surface thereof, and a ball rollably interposed between the outer raceway and the inner raceway and also in which the rolling surface of the ball is contacted with the outer raceway and the inner raceway each at two points.

Further, the output rotation transmission member may be an output gear, the width of the near-to-outer-periphery portion of the output gear may be set larger than that of the near-to-outside portion of a second gear being meshingly engageable with the output gear and advancing into between the outer surfaces of the pair of output side disks, and the axial-direction two end faces of the near-to-outer-periphery portion of the output gear may be respectively contacted with the outer surfaces of the pair of output side disks.

In the case of the above-structured toroidal-type continuously variable transmission according to the present embodiment, the spaces, which exist between the input side inner surfaces of the input side disks and the output side inner surfaces of the output side disks and are conventionally considered as dead spaces and not used, are used to support the output cylinder. Thanks to this, there is eliminated the need for provision of the a rolling bearing and thus, correspondingly to the omitted rolling bearing, the distance between the two output side disks can be reduced, which makes it possible to reduce the size and weight of the toroidal-type continuously variable transmission.

Further, in case where the axial-direction two end faces of the near-to-outer-periphery portion of the output gear are respectively contacted with the outer surfaces of the two output side disks, the two output side disks can be backed up by the output gear, which makes it possible to prevent the elastic deformation of the two output side disks regardless of the moment loads that are applied thereto from the respective power rollers. This can reduce the axial-direction thickness dimensions of the two output side disks. That is, from this aspect as well, the present toroidal-type continuously variable transmission can be reduced in size and weight.

DETAILED DESCRIPTION OF THE PREFERRED EMBODIMENT

Figure 1:
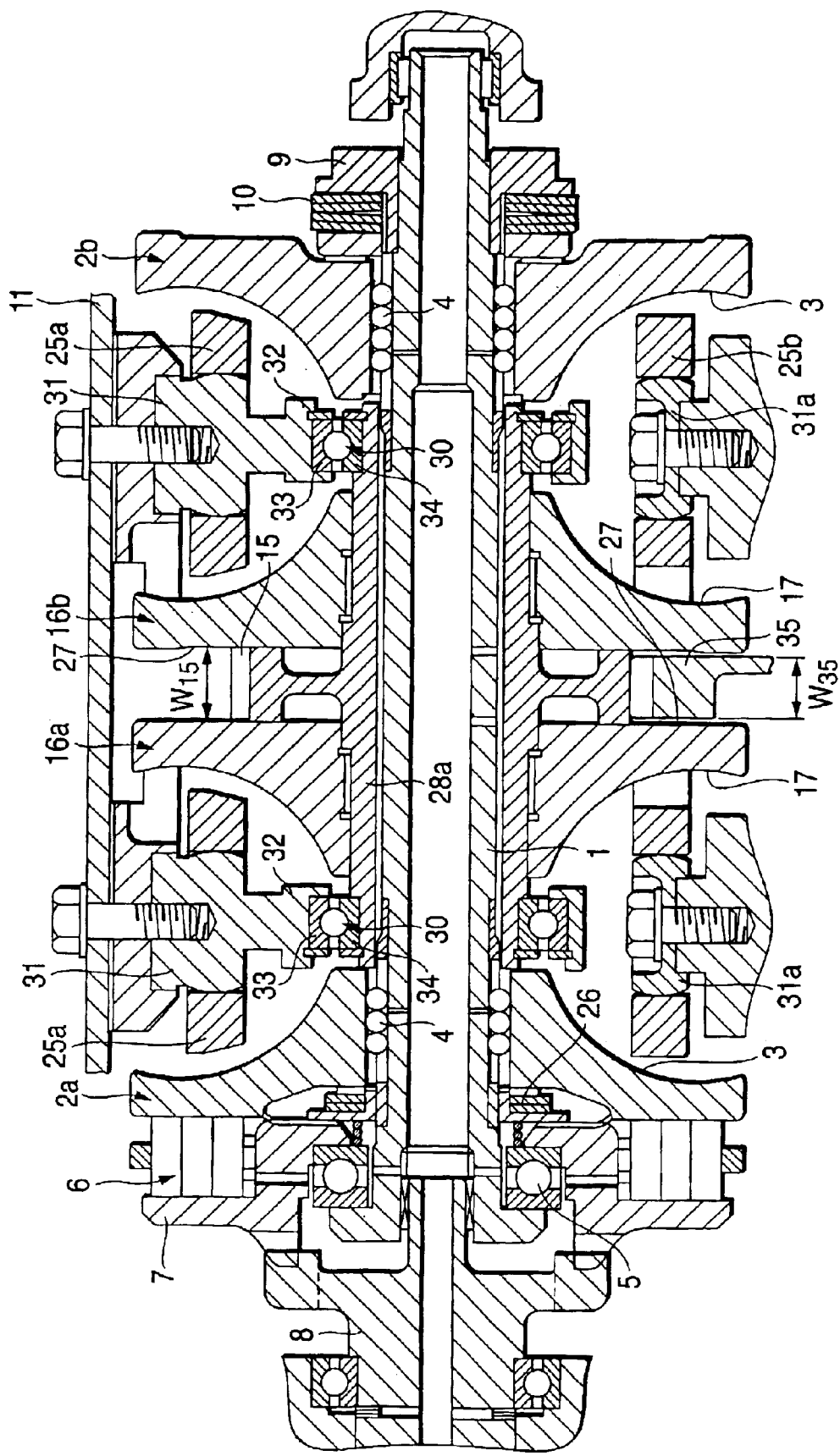
FIG. 1 is a section view of the main portions of a first embodiment of a toroidal-type continuously variable transmission according to the present invention.

Now, FIG. 1 shows a first embodiment of a toroidal-type continuously variable transmission according to the present invention. By the way, the present embodiment is characterized in that a structure for supporting an output cylinder 28a with an output gear 15 and output side disks 16a, 16b disposed thereon is improved to thereby reduce the size and weight of the toroidal-type continuously variable transmission. The structures and operations of the remaining portions of the present toroidal-type continuously variable transmission are similar to those of the conventional structure previously discussed with reference to FIG. 3. Therefore, the illustration and description of the equivalent portions of the present embodiment are omitted or simplified and thus description will be given below mainly of the characteristic portions of the present embodiment.

Figure 3:
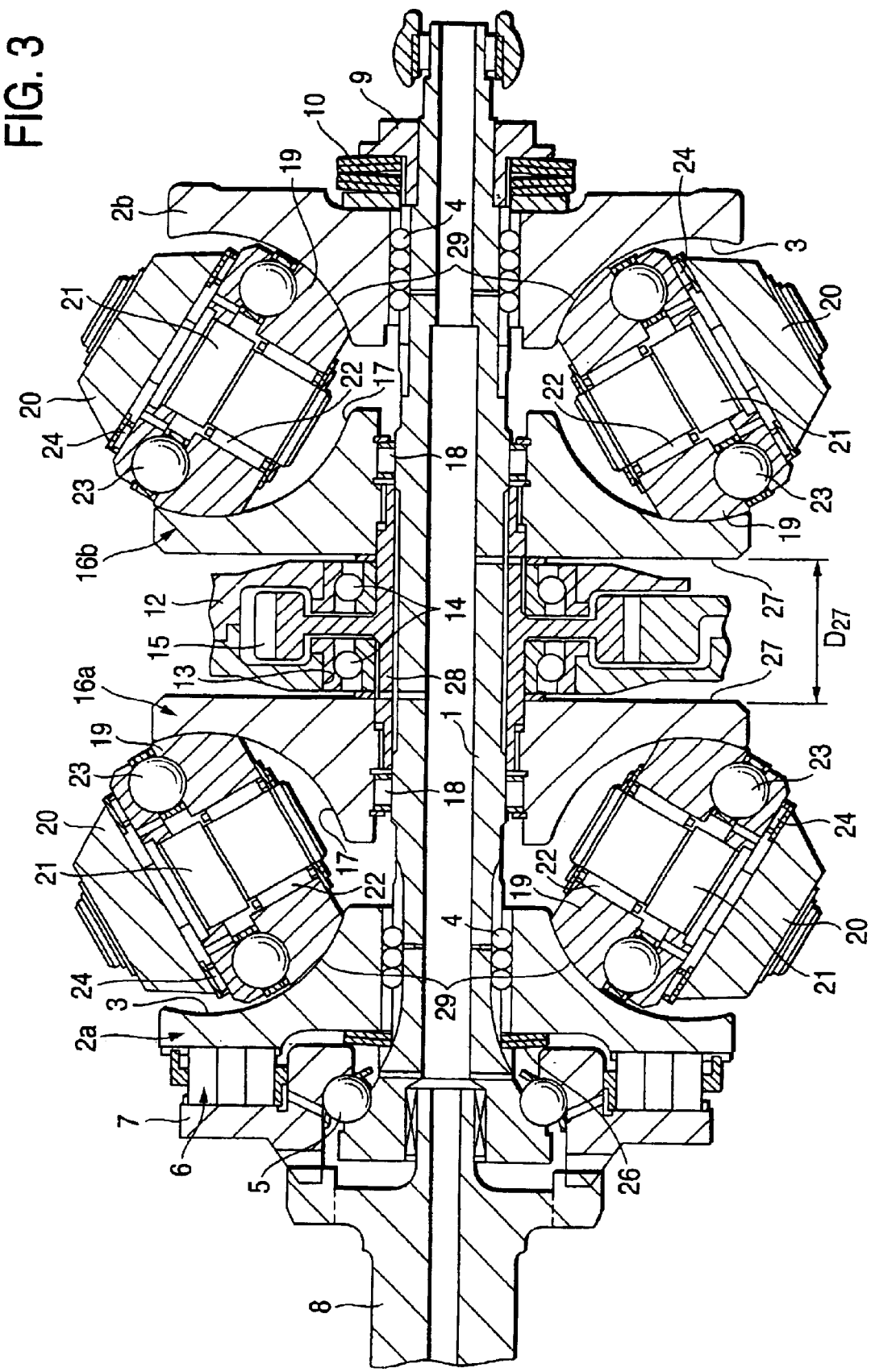

In the case of a toroidal-type continuously variable transmission according to the present embodiment, the axial-direction dimension of the output cylinder 28a is set larger than the conventional structure shown in the previously discussed FIG. 3. And, the two end portions of the output cylinder 28a are respectively projected further toward their associated input side disks 2a, 2b disposed opposed to the output side disks 16a, 16b beyond the respective inner end faces of the output side disks 16a, 16b. However, between the two end portions of the output cylinder 28a and the inner end faces of the input side disks 2a, 2b, there are interposed clearances to thereby prevent these end faces from rubbing against each other. And, such portions of the two end portions of the output cylinder 28a that project from the inner end faces of the output side disks 16a, 16b are supported on a casing 11 respectively by ball bearings 30, 30 of an angular contact type or a deep groove type in such a manner that the projecting portions can be rotated.

Specifically, according to the present embodiment, on support posts 31, 31 which are respectively used to support their associated support plates 25a, 25b thereon, there are disposed hold rings 32, 32 for holding the ball bearings 30, 30 in such a manner that the hold rings 32, 32 are formed integrally with the support posts 31, 31. As disclosed in many publications such as patent publications and thus known to the public, the support posts 31, 31a are fixed to the interior of the casing 11 which supports the support plates 25a, 25b for supporting pivot shafts disposed on the two end portions of trunnions 20, 20 (see FIG. 3) employed in a half-toroidal-type toroidal-type continuously variable transmission. The support plates 25a, 25b are supported on the interior of the casing 11 by their respective support posts 31, 31a in such a manner that they can be shifted to a certain degree.

By the way, the support posts 31, 31a are disposed on the mutually opposite sides of an input rotary shaft 1 in the diameter direction thereof by a pair in each cavities (spaces which respectively exist between the input side inner surfaces 3 and output side inner surfaces 17 and also in which power rollers are disposed). In the case of the present embodiment, of these support posts 31, 31a, on the support posts 31, 31 that are situated on one side (in FIG. 1, on the upper side), there are disposed the hold rings 32, 32 integrally therewith. And, not only outer rings 33, 33 respectively constituting the ball bearings 30, 30 are fitted with the inner surfaces of their associated hold rings 32, 32 and are fixed by retaining rings, but also inner rings 34, 34 respectively constituting the ball bearings 30, 30 are fitted with the outer surfaces of the two end portions of the output cylinder 28a and are similarly fixed by retaining rings. Using this structure, the output cylinder 28a is supported on the periphery of the middle portion of the input rotary shaft 1 in such a manner that it can be rotated independently of the input rotary shaft 1. According to the present embodiment, there is eliminated the radial needle roller bearing 22 which is employed in the conventional structure shown in FIG. 3.

Also, the contact angles of the two ball bearings 30, 30 are set in the mutually opposite directions (ordinarily, they are combined together face to face), whereby a thrust load applied to the output cylinder 28a can be supported by the ball bearings 30, 30. That is, the output gear 15 is composed of a helical gear to thereby reduce noises generated in the mutually engaged portion of the output gear 15 with a second gear 35 used to take out power. When the toroidal-type continuously variable transmission is in operation, a thrust load is applied to the output cylinder 28a with the output gear 15 fixed thereto. The direction, in which the thrust load is applied when power is transmitted from an engine to a drive wheel, is opposite to the direction of the thrust load when engine braking for speed reduction is applied. For this reason, the directions of the contact angles of the two ball bearings 30, 30 are set opposite to each other; and thus, even when the thrust load is applied in any one of the directions, the thrust load can be supported by any one of the ball bearings 30.

Further, in the case of the present embodiment, the width $W_{15}$ of the near-to-outer-periphery portion of the output gear 15 is set larger than the width $W_{35}$ of such portion of the near-to-outer-periphery portion of a second output gear 35 to be meshingly engaged with the output gear 15 that advances into between the outer surfaces 27, 27 of the pair of output side disks 16a, 16b ($W_{15} > W_{35}$). And, the axial-direction two end faces of the near-to-outer-periphery portion of the output gear 15 are respectively contacted with the outer surfaces 27, 27 of the pair of output side disks 16a, 16b. On the other hand, the axial-direction two side surfaces of the gear 35 are respectively separated from the outer surfaces 27, 27 of the pair of output side disks 16a, 16b to thereby prevent these surfaces from rubbing against each other when the toroidal-type continuously variable transmission is in operation.

As described above, in the case of a toroidal-type continuously variable transmission according to the present embodiment, the spaces which exist between the input side inner surfaces 3, 3 and output side inner surfaces 17, 17 and are conventionally considered as dead spaces and not used, that is, the near-to-inside-diameter portions of the cavities are used to support the output cylinder 28a. Thanks to this, between the pair of output side disks 16a, 16b, there is eliminated the need for provision of the two rolling bearings 14, 14 that are used in the conventional structure shown in FIG. 3. And, correspondingly to the omission of the two rolling bearings 14, 14, the distance between the two output side disks 16a, 16b can be reduced, which makes it possible to reduce the size and weight of the toroidal-type continuously variable transmission.

Also, in the case of the present embodiment, since the axial-direction two end faces of the near-to-outer-periphery portion of the output gear 15 are respectively contacted with the outer surfaces 27, 27 of the pair of output side disks 16a, 16b, the two output side disks 16a, 16b can be backed up by the output gear 15. That is, when the toroidal-type continuously variable transmission is in operation, these output side disks 16a, 16b are moved by the power rollers in their mutually approaching direction while the output side disks 16a, 16b are respectively pressed with the same pressure. According to the present embodiment, the forces applied to the two output side disks 16a, 16b in this manner are applied to the near-to-outer-periphery portion of the output gear 15, and the forces are cancelled by each other in the present portion. As a result of this, the two output side disks 16a, 16b can be prevented from being elastically deformed regardless of the moment loads that are applied thereto from the respective power rollers. This can reduce the axial-direction thickness dimensions of the two output side disks 16a, 16b and, therefore, from this aspect as well, the present toroidal-type continuously variable transmission can be reduced in size and weight.

Figure 2:
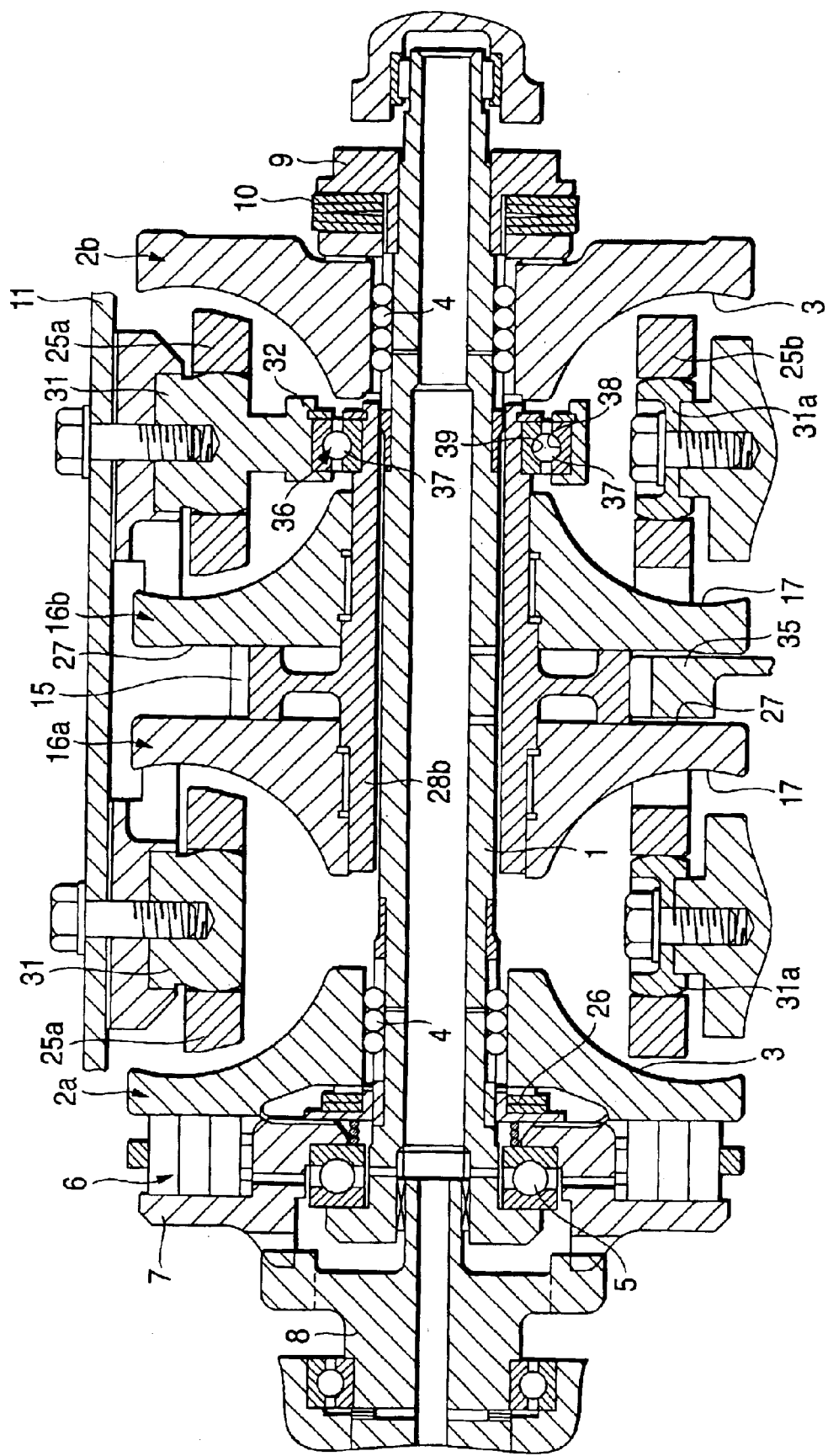
FIG. 2 is a section view of the main portions of a second embodiment of a toroidal-type continuously variable transmission according to the present invention; and, FIG. 3 is a section view of an example of the basic structure of a conventional toroidal-type continuously variable transmission which is widely known, in which the circumferential-direction phase thereof is different by 90° from the toroidal-type continuously variable transmissions shown in FIGS. 1 and 2.

Next, FIG. 2 shows a second embodiment of a toroidal-type continuously variable transmission. According to the present embodiment, the one end (in FIG. 2, the left end) side of an output cylinder 28b is set shorter than the previously described first embodiment, while one end face of the output cylinder 28b and the inner end face of one (in FIG. 2, left) output side disk 16a are set substantially at the same position. On the other hand, the other end of the output cylinder 28b, similarly to the previously described first embodiment, is projected further beyond the inner end face of the other output side disk 16b. And, a ball bearing 36 is interposed between the other end portion of the output cylinder 28b and a hold ring 32 disposed on a support post 31, while the output cylinder 28b is rotatably supported on the periphery of the middle portion of an input rotary shaft 1. A structure for assembling the ball bearing 36 into between the output cylinder 28b and hold ring 32 is similar to the structure shown in the previously described first embodiment.

Especially, in the case of the present embodiment, as the ball bearing 36, there is used a ball bearing of a four-point contact type in which the rolling surfaces of two balls 37, 37 are contacted with an outer raceway 38 and an inner raceway 39 each at two points, that is, at a total of four points in each of the balls 37, 37. Therefore, the single ball bearing 36 can support the thrust loads that are applied from two directions. Due to this, there is eliminated the need for provision of a rolling bearing in the cavity portion existing between one input side inner surface 3 and one output side inner surface 17 opposed to the present input side inner surface 3, thereby providing a structure similar to the conventional structure. The structures and operations of the remaining portions of the second embodiment are similar to those of the previously described first embodiment. Therefore, the equivalent portions thereof are given the same designations and thus the duplicate description thereof is omitted here.

Since the present invention is structured and operated in the above-mentioned manner, there can be provided a toroidal-type continuously variable transmission which can be reduced in the axial-direction dimension thereof and thus can be reduced in size and weight while securing its required performance. This makes it possible to incorporate the present toroidal-type continuously variable transmission into a more compact vehicle body. That is, the present invention is able to contribute to practical use of a toroidal-type continuously variable transmission.

What is claimed is:

1. A toroidal continuously variable transmission, comprising:

a casing;

an input rotary shaft rotatably supported in the interior of the casing;

a pair of input side disks each including an input side inner surface having an arc-shaped section and respectively supported on the two portions of the input rotary shaft in such a manner that the respective input side inner surfaces are opposed to each other, the pair of input side disks being rotatable synchronously with the input rotary shaft;

an output cylinder supported on the periphery of the middle portion of the input rotary shaft so as to be rotated relatively with respect to the input rotary shaft;

a pair of output side disks each including an output side inner surface having an arc-shaped section and respectively supported on the periphery of the output cylinder so as to be rotated synchronously with the output cylinder, the output side inner surfaces of the output side disks being respectively opposed to the input side inner surfaces of the input side disks;

an output rotation transmission member fixed to the outer peripheral surface of the middle portion of the output cylinder between the two output side disks so as to be concentric with the two output side disks;

a plurality of support members interposed respectively between the input side inner surfaces of the input side disks and the output side inner surfaces of the output side disks, the support members each having a pivot shaft that extends in a twisted direction with respect to the input rotary shaft, the support members each disposed swingably with respect to the associated pivot shaft;

power rollers each including a peripheral surface formed as a spherically-shaped convex surface and respectively rotatably supported on associated ones of the support members, the peripheral surfaces of the power rollers being contacted with the input side inner surfaces of the input side disks and the output side inner surfaces of the output side disks; and, a rolling bearing disposed between the input side inner surface of at least one of the input side disks and the output side inner surfaces opposed to the input side inner surface so as to be supported in the casing, and rotatably supporting the output cylinder.

2. The toroidal continuously variable transmission as set forth in claim 1, wherein a pair of rolling bearings respectively disposed between the respective input side inner surfaces of the input side disks and the respective output side inner surfaces of the output side disks rotatably support the two end portions of the output cylinder, and the two rolling bearings are an angular contact ball bearing with the directions of respective contact angles thereof differing from each other or a deep groove ball bearing.

3. The toroidal continuously variable transmission as set forth in claim 2, wherein the output rotation transmission member is an output gear, the width of a substantially outer peripheral portion of the output gear is set larger than that of a substantially outside portion of a second gear being meshingly engageable with the output gear and advancing into a position between the outer surfaces of the pair of output side disks, and the axial-direction two end faces of the outer peripheral portion of the output gear are respectively contacted with the outer surfaces of the pair of output side disks.

4. The toroidal continuously variable transmission as set forth in claim 1, wherein a rolling bearing disposed between one of the input side inner surfaces of the input side disks and the output side inner surfaces of the output side disks opposed to the input side inner surface rotatably supports one end portion of the output cylinder, and the rolling bearing is a four point contact ball bearing which includes an outer ring having an outer raceway formed in an inner surface thereof, an inner ring having an inner raceway formed in an outer surface thereof, and a ball rollably interposed between the outer raceway and the inner raceway and also in which the rolling surface of the ball is contacted with the outer raceway and the inner raceway each at two points.

5. The toroidal continuously variable transmission as set forth in claim 4, wherein the output rotation transmission member is an output gear, the width of a substantially outer peripheral portion of the output gear is set larger than that of a substantially outside portion of a second gear being meshingly engageable with the output gear and advancing into a position between the outer surfaces of the pair of output side disks, and the axial-direction two end faces of the outer peripheral portion of the output gear are respectively contacted with the outer surfaces of the pair of output side disks.

6. The toroidal continuously variable transmission as set forth in claim 1, wherein the output rotation transmission member is an output gear, the width of a substantially outer peripheral portion of the output gear is set larger than that of a substantially outside portion of a second gear being meshingly engageable with the output gear and advancing into a position between the outer surfaces of the pair of output side disks, and the axial-direction two end faces of the outer peripheral portion of the output gear are respectively contacted with the outer surfaces of the pair of output side disks.

* * * * *